United States Patent
Sehrawat et al.

(10) Patent No.: US 11,515,996 B2
(45) Date of Patent: Nov. 29, 2022

(54) ENFORCING ACCESS STRUCTURES IN FULLY HOMOMORPHIC ENCRYPTION

(71) Applicant: Seagate Technology LLC, Fremont, CA (US)

(72) Inventors: Vipin Singh Sehrawat, Shugart (SG); Foo Yee Yeo, Shugart (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/164,609

(22) Filed: Feb. 1, 2021

(65) Prior Publication Data

US 2022/0255720 A1    Aug. 11, 2022

(51) Int. Cl.
*H04L 9/00* (2022.01)
*H04L 9/06* (2006.01)
*H04L 9/30* (2006.01)
*H04L 9/14* (2006.01)

(52) U.S. Cl.
CPC ............ *H04L 9/008* (2013.01); *H04L 9/0618* (2013.01); *H04L 9/14* (2013.01); *H04L 9/3093* (2013.01)

(58) Field of Classification Search
CPC ......... H04L 9/008; H04L 9/0618; H04L 9/14; H04L 9/3093
See application file for complete search history.

(56) References Cited

U.S. PATENT DOCUMENTS

| | | |
|---|---|---|
| 8,515,058 B1 | 8/2013 | Gentry |
| 9,313,028 B2 | 4/2016 | Tamayo-Rios |
| 9,716,590 B2 | 7/2017 | Gentry |
| 10,057,057 B2 | 8/2018 | Gentry et al. |
| 2021/0036849 A1* | 2/2021 | Honorio Araujo da Silva ............ H04L 9/0891 |
| 2021/0194668 A1 | 6/2021 | Masters et al. |
| 2021/0234689 A1* | 7/2021 | Song .................... H04L 9/3093 |
| 2021/0376996 A1 | 12/2021 | Moon et al. |
| 2022/0029783 A1* | 1/2022 | Cheon .................. H04L 9/3093 |
| 2022/0052834 A1* | 2/2022 | Vaikuntanathan ........ H04L 9/14 |
| 2022/0092150 A1 | 3/2022 | Cheon et al. |

OTHER PUBLICATIONS

Private Intersection of Certified Sets, by Camenisch et al.. (Year: 2019).*
Craig Gentry. "Fully homomorphic encryption using ideal lattices." In Michael Mitzenmacher, editor, STOC, pp. 169-178. ACM, 2009.
Dennis Hofheinz. "All-But-Many Lossy Trapdoor Functions." In: EUROCRYPT. 2012, pp. 209-227.

(Continued)

*Primary Examiner* — Vu V Tran
(74) *Attorney, Agent, or Firm* — Holzer Patel Drennan

(57) ABSTRACT

A homomorphic encryption system receives a ciphertext output of an arithmetic evaluation function. The arithmetic evaluation function is performed on a ciphertext input homomorphically encrypted from a plaintext input using a set-system including sets having an intersection property. The ciphertext output is decrypted using a summation of two or more noise-canceling party identifiers of two or more authorized parties, wherein the intersection property of the sets cancels out errors generated during the decrypting operation for the two or more authorized parties.

17 Claims, 6 Drawing Sheets

(56) References Cited

OTHER PUBLICATIONS

P. Erdós. "Some remarks on the theory of graphs." In: Bull. Amer. Math. Soc. (1947), pp. 292-294.
Markus Ruckert. "Lattice-Based Blind Signatures." In: ASIACRYPT. 2010, pp. 413-430.
Shweta Agrawal, David Mandell Freeman, and Vinod Vaikuntanathan. "Functional Encryption for Inner Product Predicates from Learning with Errors." In: ASIACRYPT. 2011, pp. 21-40.
M. Ajtai. "Generating Hard Instances of the Short Basis Problem." In: ICALP. 1999, pp. 1-9.
Adi Akavia, Shafi Goldwasser, and Vinod Vaikuntanathan. "Simultaneous Hardcore Bits and Cryptography against Memory Attacks." In: TCC. 2009, pp. 474-495.
Erdem Alkim, Paulo S. L. M. Barreto, Nina Bindel, Juliane Kramer, Patrick Longa, and Jefferson E. Ricardini. The Lattice-Based Digital Signature Scheme qTESLA. Apr. 2020. url: https://eprint.iacr.org/2019/085.pdf.
Benny Applebaum, David Cash, Chris Peikert, and Amit Sahai. "Fast Cryptographic Primitives and Circular-Secure Encryption Based on Hard Learning Problems." In: CRYPTO. 2009.
Abhishek Banerjee, Georg Fuchsbauer, Chris Peikert, Krzysztof Pietrzak, and Sophie Stevens. "Key-Homomorphic Constrained Pseudorandom Functions." In: TCC. 2015, pp. 31-60.
Abhishek Banerjee and Chris Peikert. "New and Improved Key-Homomorphic Pseudorandom Functions." In: CRYPTO. 2014, pp. 353-370.
Abhishek Banerjee, Chris Peikert, and Alon Rosen. "Pseudorandom Functions and Lattices." In: EUROCRYPT. 2012, pp. 719-737.
David A. Mix Barrington, Richard Beigel, and Steven Rudich. "Representing Boolean functions as polynomials modulo composite numbers." In: Computational Complexity 4 (1994), pp. 367-382.
Hayo BaanSauvik Bhattacharya, Scott Fluhrer, Oscar Garcia-Morchon, Thijs Laarhoven, Ronald Rietman, Markku-Juhani O. Saarinen, Ludo Tolhuizen, and Zhenfei Zhang. "Round5: Compact and Fast Post-quantum Public-Key Encryption." In: PQCrypto. 2019, pp. 83-102.
Dan Boneh, Kevin Lewi, Hart Montgomery, and Ananth Raghunathan. "Key homomorphic PRFs and their applications " In: CRYPTO. 2013, pp. 410-428.
Joppe Bos, Léo Ducas, Eike Kiltz, Tancrede Lepoint, Vadim Lyubashevsky, John M. Schanckk, Peter Schwabe, Gregor Seiler, and Damien Stehle. "CRYSTALS-Kyber: A CCA-Secure Module-Lattice-Based KEM." In: IEEE European Symposium on Security and Privacy (EuroS&P). 2018, pp. 353-367.
Joppe W. Bos, Craig Costello, Léo Ducas, Ilya Mironov, Michael Naehrig, Valeria Nikolaenko, Ananth Raghunathan, and Douglas Stebila. "Frodo: Take off the ring! practical, quantum-secure key exchange from LWE." In: ACM SIGSAC Conference on Computer and Communications Security. 2016, pp. 1006-1018.
Xavier Boyen and Qinyi Li. "All-But-Many Lossy Trapdoor Functions from Lattices and Applications." In: CRYPTO. 2017, pp. 298-331.
Zvika Brakerski, Adeline Langlois, Chris Peikert, Oded Regev, and Damien Stehlé. "Classical hardness of learning with errors." In: STOC (2013), pp. 575-584.
Zvika Brakerski and Vinod Vaikuntanathan. "Constrained Key-Homomorphic PRFs from Standard Lattice Assumptions—or: How to Secretly Embed a Circuit in Your PRF." In: TCC. 2015, pp. 1-30.
Zvika Brakerski and Vinod Vaikuntanathan. "Fully Homomorphic Encryption from Ring-LWE and Security for Key Dependent Messages." In: CRYPTO. 2011, pp. 505-524.

Yilei Chen, Nicholas Genise, and Pratyay Mukherjee. "Approximate Trapdoors for Lattices and Smaller Hash-and-Sign Signatures." In: ASIACRYPT. 2019, pp. 3-32.
R. M. Corless, G. H. Gonnet, D. E. G. Hare, D. J. Jeffrey, and D. E. Knuth. "On the LambertW function." In: Adv. Comput. Math. 5 (1996), pp. 329-359.
Jan-Pieter D'Anvers, Angshuman Karmakar, Sujoy Sinha Roy, and Frederik Vercauteren. "Saber: Module-LWR Based Key Exchange,CPA-Secure Encryption and CCA-Secure KEM." In: AFRICACRYPT. 2018, pp. 282-305.
Léo Ducas, Eike Kiltz, Tancrede Lepoint, Vadim Lyubashevsky, Peter Schwabe, Gregor Seiler, and Damien Stehlé. CRYSTALS-Dilithium: A Lattice-Based Digital Signature Scheme. IACR. 2017. url: https://eprint.iacr.org/2017/633.pdf.
Pierre-Alain Fouque et al. FALCON: Fast-Fourier Lattice-based Compact Signatures over NTRU. url: https://falcon-sign.info/falcon pdf.
Craig Gentry, Chris Peikert, and Vinod Vaikuntanathan Craig Gentry. "Trapdoors for hard lattices and new cryptographic constructions." In: STOC. 2008, pp. 197-206.
Shafi Goldwasser, Yael Kalai, Raluca Ada Popa, Vinod Vaikuntanathan, and Nickolai Zeldovich. "Reusable garbled circuits and succinct functional encryption." In: STOC. 2013, pp. 555-564.
Vince Grolmusz. "Superpolynomial Size Set-systems with Restricted Intersections mod 6 and Explicit Ramsey Graphs." In: Combinatorica 20 (2000), pp. 71-86.
Charles Grover, Cong Ling, and Roope Vehkalahti. Non-Com mutative Ring Learning With Errors From Cyclic Algebras. Cryptology ePrint Archive, Report 2019/680. https://eprint.iacr.org/2019/680. 2019.
Shai Halevi and Victor Shoup. Bootstrapping for HElib. Cryptology ePrint Archive, Report 2014/873. https://eprint.iacr.org/2014/873. 2014.
Vipin Singh Sehrawat and Yvo Desmedt. "Bi-Homomorphic Lattice-Based PRFs and Unidirectional Updatable Encryption " In: CANS. vol. 11829. LNCS, Springer, 2019, pp. 3-23.
Jonathan Katz and Vinod Vaikuntanathan. "Smooth Projective Hashing and Password-Based Authenticated Key Exchange from Lattices" In: ASIACRYPT. 2009, pp. 636-652.
Chris Peikert and Brent Waters. "Lossy trapdoor functions and their applications." In: ACM Symposium on Theory of Computing (STOC) 2008, pp. 187-196.
Vadim Lyubashevsky. "Fiat-Shamir with Aborts: Applications to Lattice and Factoring-Based Signatures." In: ASIACRYPT. 2009, pp. 598-616.
Vadim Lyubashevsky. "Lattice Signatures without Trapdoors." In: EUROCRYPT. 2012, pp. 738-755.
Vadim Lyubashevsky, Chris Peikert, and Oded Regev. "On Ideal Lattices and Learning with Errors over Rings." In: EUROCRYPT. 2010.
Daniele Micciancio and Chris Peikert. "Hardness of SIS and LWE with Small Parameters." In: CRYPTO. 2013, pp. 21-39.
Daniele Micciancio and Chris Peikert. "Trapdoors for lattices: Simpler, tighter, faster, smaller." In: EUROCRYPT. 2012, pp. 700-718.
Chris Peikert. "A Decade of Lattice Cryptography." In: Foundations and Trends in Theoretical Computer 10 (2016), pp. 283-424.
Chris Peikert. "Public-key cryptosystems from the worst-case shortest vector problem." In: STOC (2009), pp. 333-342.
Chris Peikert and Alon Rosen. "Efficient Collision-Resistant Hashing from Worst-Case Assumptions on Cyclic Lattices." In: TCC. 2006, pp. 145-166.
Simkin, Mark, et al., "The Communication Complexity of Threshold Private Set Intersection", Annual International Cryptology Conference; CRYPTO; Advances in Cryptology, 2019, 3-29.

* cited by examiner

400

Receive ciphertext input homomorphically encrypted from a plaintext input using a set-system including sets having an intersection property
402

Evaluate an arithmetic function on the ciphertext input to generate a ciphertext output, the arithmetic function including one or more additive gates and one or more multiplicative gates, wherein the evaluating operation generates errors during evaluation of the arithmetic function and the intersection property of the sets cancel out the errors during the evaluating operation
404

Transmit the ciphertext output for homomorphic decryption to generate a plaintext result
406

Receive a ciphertext output of an arithmetic evaluation function, the arithmetic evaluation function being performed on a ciphertext input homomorphically encrypted from a plaintext input using a set-system including sets having an intersection property
502

Decrypt the ciphertext output using a summation of two or more noise cancelling party identifiers of two or more authorized parties, wherein the intersection property of the sets cancels out the errors for the two or more authorized parties during the decryption operation
504

Attempt to decrypt the ciphertext output using a summation of one or more noise cancelling party identifiers of one or more unauthorized parties, wherein the intersection property of the sets fails to cancel out the errors for the one or more unauthorized parties during the attempted decryption and the attempted decryption operation fails for the one or more unauthorized parties
506

FIG. 5

ENFORCING ACCESS STRUCTURES IN FULLY HOMOMORPHIC ENCRYPTION

CROSS-REFERENCE TO RELATED APPLICATIONS

The present application is related by subject matter to U.S. application Ser. No. 17/164,509, filed concurrently herewith and entitled "Fully Homomorphic Encryption from Error Canceling Set-Systems," which is specifically incorporated by reference for all that it discloses and teaches.

SUMMARY

The described technology provides methods and systems for homomorphic encryption, including receiving a ciphertext output of an arithmetic evaluation function. The arithmetic evaluation function is performed on a ciphertext input homomorphically encrypted from a plaintext input using a set-system including sets having an intersection property. The ciphertext output is decrypted using a summation of two or more noise-canceling party identifiers of two or more authorized parties, wherein the intersection property of the sets cancels out errors generated during the decrypting operation for the two or more authorized parties.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 4 illustrates example operations for evaluating homomorphically encrypted ciphertext.

FIG. 5 illustrates example operations for decrypting homomorphically encrypted ciphertext.

DETAILED DESCRIPTIONS

Homomorphic encryption allows certain computations on encrypted data (i.e., ciphertexts generated from plaintext data) to generate an encrypted result that, when decrypted, matches the result of the same operations performed on the plaintext data. Homomorphic encryption can be applied to computations that are known and relatively simple (e.g., a limited number of additions and multiplications). For example, a data owner wishes to send data to the cloud for computation but does not trust the cloud service provider with the data. Using a homomorphic encryption scheme, the data owner can encrypt the data and send it to the cloud service, which performs the computations on the data without decrypting it and sends the encrypted results back to the data owner. The data owner can then decrypt the encrypted results to access the plaintext results. In some implementations, the encrypted results may be decrypted by an authorized subset of collaborating parties according to an enforced access structure.

Fully Homomorphic Encryption (FHE) refers to homomorphic encryption schemes that allow an unbounded number of addition and multiplication operations over the encrypted data. Generally, adding ciphertexts together adds a small error (sometimes referred to as "noise") to the computational results. In contrast, multiplying ciphertexts together tends to introduce greater error in the computational results during evaluation. Limiting, diminishing, or eliminating the error from the evaluation result may involve constraining the number and types of operations performed, bootstrapping, or some other supplemental error-removal operations (which can significantly decrease the performance of the evaluation), etc.

As an alternative, a set-system may be selected that includes sets having an intersection property that cancels out the error during the evaluation, rather than by constraining the operation or performing supplemental error-removal operations. This approach dramatically improves the performance of the evaluation. Vectors may be selected from a covering vector family that represents the set-system, such that the inner product of the vectors equals a multiple of a chosen non-prime integer when the size of the intersection of the sets represented by the two vectors is a multiple of the non-prime integer. The vectors may be used to homomorphically encrypt plaintext into ciphertext input for the evaluation. Errors generated during the evaluation are then canceled out based on the intersection properties of the set-system used to encrypt the ciphertext input.

Figure 1:
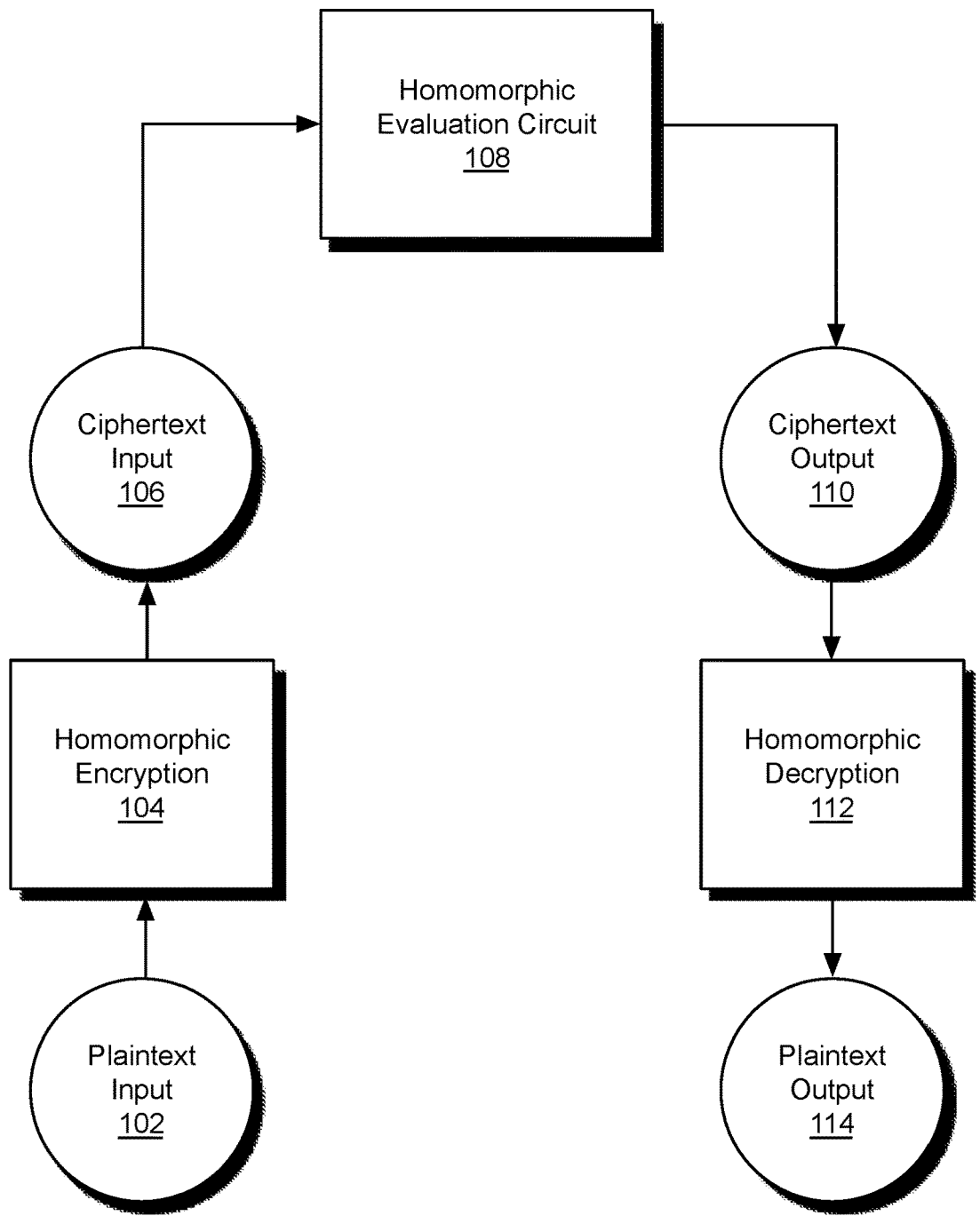
FIG. 1 illustrates an example fully homomorphic encryption system.

FIG. 1 illustrates an example fully homomorphic encryption system 100. Plaintext input 102, which may be encoded from raw input data, is received through a communications interface of an encryption operator configured to perform a homomorphic encryption 104 process based on a set-system having an intersection property. In one implementation, the intersection property is characterized by two vectors of a covering vector family of the set-system that have an inner product equal to a multiple of a chosen non-prime integer when the size of the intersection of the sets represented by the two vectors is a multiple of the non-prime integer. The result of the homomorphic encryption 104 is output via the communications interface of the encryption operator as ciphertext input 106.

In one implementation, the homomorphic encryption 104 can be described as follows. A vector $v \xleftarrow{\$} \mathcal{V}$ is sampled from the covering vector family $\mathcal{V}$ such that the set $H \in \mathcal{H}$ represented by v has $s^{l-1}$ proper supersets in $\mathcal{H}$. Recall that s is superpolynomial w.r.t. h and r. An error E is randomly sampled from a cyclic generator set $\mathfrak{S}$ for module M, which is used to define the CLWE distribution. Party $P_b$ ($b \in \{0,1\}$) is provided with $\{E, A_0, A, x_b\}$, where $x_b = \langle v, v_b \rangle$ for some $v_b \in \mathcal{V}$ such that $H_b \not\subseteq H$ and $H \not\subseteq H_b$. Pick an integer q such that $m = l\varphi(q)$ and $l^2 \varphi(q) = q$. Party $P_b$ encrypts its plaintext $S_b \in \mathfrak{S}$ and generates addition compatible ciphertext as: $C_a^{(b)} = AS_b + \langle v, v_b \rangle E$ mod q. Party $P_0$ generates multiplication compatible ciphertext $C_d^{(0)}$ as: $C_d^{(0)} A_0 = AS_0 + E \langle v, v_0 \rangle$ mod q, and party $P_1$ generates its multiplication compatible ciphertext as: $C_d^{(1)} A = A_0 S_1 + E \langle v, v_1 \rangle$ mod q. $C_d^{(b)}$ can be computed via lattice trapdoors.

The ciphertext input 106 is provided to a homomorphic evaluation circuit 108 having one or more multiplicative gates and/or additive gates in the homomorphic evaluation circuit 108. Each level in the homomorphic evaluation circuit 108 has one matrix assigned to it. A is the level 0 matrix. The matrices for all other levels alternate between A and $A_0$. Addition of any two addition compatible ciphertexts is straightforward via simple addition, yielding a result that depends upon the choice of $v_0$ and $v_1$. Multiplication of two compatible ciphertexts can be performed as:

$$C_d^{(1)} C_d^{(0)} A_0 = C_d^{(1)}(AS_0 + E^{\langle v, v_0 \rangle}) \mod q$$
$$= C_d^{(1)} AS_0 + C_d^{(1)} E^{\langle v, v_0 \rangle} \mod q$$
$$= A_0 S_1 S_0 + E^{\langle v, v_1 \rangle} S_0 + C_d^{(1)} E^{\langle v, v_0 \rangle} \mod q.$$

Since $\mathfrak{I}$ is cyclic the "nature" of the errors remains preserved throughout the multiplication. If $S_0 = E^{\langle v, v_z \rangle}$ for some randomly sampled $v_z \in \mathcal{V}$, then the errors get reduced in the desired manner.

The result of the evaluation is output as homomorphically encrypted ciphertext output 110, which is received through a communication interface of a decryption operator configured to perform a homomorphic decryption 112 process to yield the plaintext output 114 of the evaluation. The plaintext output 114 may also be output via the communication interface. Accordingly, the ciphertext input 106 can be evaluated against an arithmetic function without the ciphertext input 106, the ciphertext output 110, and any intermediate ciphertext being decrypted by the evaluating process. In some implementations, the encrypted results (the ciphertext output 110) may be decrypted by an authorized subset of collaborating parties according to an enforced access structure.

The description provided herein relies on certain notations and concepts listed below:

$\mathbb{Z}$: set of all integers,
$\mathbb{Q}$: set of all rational numbers,
$\mathbb{R}$: set of all real numbers.

Definition 1 (Hadamard/Schur product)—The Hadamard/Schur product of two vectors $u, v \in \mathcal{R}^n$ denoted by $u \circ v$ returns a vector in the same linear space whose i-th element is defined as: $(u \circ v)[i] = u[i] \cdot v[i]$, for all $\in [n]$.

Definition 2 (Negligible Function)—For a security parameter, $\omega$, a function $\epsilon(\omega)$ is called negligible if, for all $c > 0$, there exists a $\omega_0$ such that $\epsilon(\omega) < 1/\omega^c$ for all a $\omega > \omega_0$.

Theorem 3 (Euler's Theorem)—Let y be a positive integer and $\mathbb{Z}_y^*$ denote the multiplicative group mode y. Then for every integer c that is coprime to y, it holds that: $c^{\varphi(y)} = 1 \mod y$, where $\varphi(y) = |\mathbb{Z}_y^*|$ denotes Euler's totient function.

Definition 4 (Access Structures)—Let $\mathcal{P} = \{P_1, \ldots, P_\ell\}$ be a set of parties. A collection $\Gamma \subseteq 2^{\mathcal{P}}$ is monotone if $\mathcal{A} \in \Gamma$ and $\mathcal{A} \subseteq \mathcal{B}$ imply that $\mathcal{B} \in \Gamma$. An access structure $\Gamma \subseteq 2^{\mathcal{P}}$ is a monotone collection of non-empty subsets of $\mathcal{P}$. Sets in $\Gamma$ are designated as "authorized," and sets not in F are designated as "unauthorized."

If $\Gamma$ consists of all subsets of $\mathcal{P}$ with size greater than or equal to a fixed threshold t, where $(1 \leq t \leq_\ell)$, then $\Gamma$ is called a t-threshold access structure.

Definition 5 (Minimal Authorized Subset)—For an access structure $\Gamma$, a family of minimal authorized subsets $\Gamma_0 \in \Gamma$ is defined as:

$\Gamma_0 = \{ \mathcal{A} \in \Gamma : \mathcal{B} \not\subseteq \mathcal{A} \text{ for all } \mathcal{B} \in \Gamma \setminus \{\mathcal{A}\} \}$.

Hence, the family of minimal access subsets $\Gamma_0$ uniquely determines the access structure $\Gamma$, and it holds that: $\Gamma = cl(\Gamma_0)$, where cl denotes closure.

Learning with errors (LWE) denotes the computational problem of inferring a linear n-ary function $f$ over a finite ring from given samples $y_i = f(x_i)$, some of which may be erroneous. Hence, the LWE problem involves recovery of a secret s given a sequence of approximate random linear equations on it. LWE is hard to solve based on certain assumptions regarding the worst-case hardness of lattice problems, such as GapSVP (a decision version of the Shortest Vector Problem) and SIVP (Shortest Independent Vectors Problem). In group theory, a lattice in $\mathbb{R}^n$ is a subgroup of the additive group $\mathbb{R}^n$, which is isomorphic to the additive group $\mathbb{Z}^n$ and spans the real vector space $\mathbb{R}^n$. Accordingly, for any basis of $\mathbb{R}^n$, the subgroup of all linear combinations with integer coefficients of the basis vectors forms a lattice.

Definition 6 (Decision-LWE)—For positive integers n and $p \geq 2$, and an error (probability) distribution $\chi$ over $\mathbb{Z}$, the decision-$\text{LWE}_{n,q,\chi}$ problem is to distinguish between the following pairs of distributions:

$((a_i, \langle a_i, s \rangle + e_i))_i$ and $((a_i, u_i))_i$, where $i \in [\text{poly}(n)]$, $a_i \xleftarrow{\$} \mathbb{Z}_q^n$, $s \xleftarrow{\$} \mathbb{Z}_q^n$, $e_i \xleftarrow{\$} \chi$, and $u_i \xleftarrow{\$} \mathbb{Z}_q$.

For a certain noise distribution $\chi$ and a sufficiently large q, the LWE problem is as hard as the worst-case SIVP and GapSVP under a quantum reduction. This conclusion has been extended to show that s can be sampled from a low norm distribution (in particular, from the noise distribution $\chi$), and the resulting problem is as hard as the basic LWE problem. Similarly, the noise distribution $\chi$ can be a simple low-norm distribution. Therefore, a standard hybrid argument naturally leads to the multi-secret form of LWE, which is to distinguish:

(A, B=AS+E) and (A, U), where $A \xleftarrow{\$} \mathbb{Z}_q^{m \times n}$, $S \xleftarrow{\$} \chi^{m \times n}$, $E \in \chi^{m \times n}$ and $U \xleftarrow{\$} U$ for a uniform distribution U over $\mathbb{Z}_q^{m \times n}$. It can be verified that up to an m factor loss in the distinguishing advantage, multi-secret LWE is equivalent to plain (single-secret) decision-LWE.

A lattice trapdoor function presents a mechanism for constructing ciphertext secure public-key encryption (PKE) schemes from lattice assumptions.

Definition 7—Let $n \geq wd$ be an integer and $\bar{n} = n - wd$. For $A \in \mathbb{Z}_q^{w \times n}$, we say that $R \in \mathbb{Z}_q^{\bar{n} \times wd}$ is a trapdoor for A with tag $H \in \mathbb{Z}_q^{w \times w}$ if $A[^R_I] = H \cdot G$, where $G \in \mathbb{Z}_q^{w \times wd}$ is a primitive matrix.

Given a trapdoor R for A, and an LWE instance B=AS+E mod q for some "short" error matrix E, the LWE inversion algorithm successfully recovers S (and E) with overwhelming probability.

Learning with Errors From Cyclic Algebras (CLWE) is provided based on the following:

Definition 8 (Cyclic Galois extension)—A cyclic Galois extension L/K is defined as a Galois extension such that the Galois group of L over K is the cyclic group generated by some element $\theta$ of degree $d := [L: K]$.

Definition 9 (CLWE distribution)—Let L/K be a Galois extension of number fields of degree $[L: K] = d$, $[K: \mathbb{Q}] = n$ with cyclic Galois group generated by $\theta(\cdot)$. Let $\mathcal{A} := (L/K, \theta, \gamma)$ be the resulting cyclic algebra with center K and invariant u with $u^d = \gamma \in \mathcal{O}_K$, where $\mathcal{O}_K$ represents the ring of integers over number field K. Let $\Lambda$ be an order of $\mathcal{A}$. For an error distribution $\psi$ over $\oplus_{i=1}^{d-1} u^i L \mathbb{R}$, an integer modulus $q \geq 2$, and a secret $s \in \Lambda_q^\vee$ ($\Lambda_q^\vee$ denotes the codifferent ideal, modulo q, for order $\Lambda$), a sample from the CLWE distribution $\Pi_{s,q,\psi}$ is obtained by sampling a $\xleftarrow{\$} \Lambda_q \leftarrow \psi$ and outputting $$(a, b) = \left(a, \frac{a \cdot s}{q} + e \bmod \Lambda^\vee\right) \in (\Lambda_q, \oplus_{i=1}^{d-1} u^i L_\mathbb{R})/\Lambda^\vee.$$

Definition 10 (Decision-CLWE)—Let $\Upsilon$ be some distribution on a family of errors distributions over $\oplus_{i=1}^{d-1} u^i L \mathbb{R}$ and $U_\Lambda$ denote the uniform distribution on $(\Lambda_q, (\oplus_{i=1}^{d-1} u^i L \mathbb{R})/\Lambda^\vee)$. Then, for $(s, \psi) \leftarrow U(\Lambda_q^\vee) \times \Upsilon$, the decision CLWE problem is to distinguish distribution $\Pi_{s,q,\psi}$ from $U_\Lambda$.

Based on the previously-described foundation, fully homomorphic encryption via error canceling set-systems can be provided using tools in the forms of a predefined set-system and a vector family that follows from it. Constructions for both of these tools are provided below.

A superpolynomial size set-system $\mathcal{H}$ is described first.

Definition 11—A family of sets $\{G_1, G_2, \ldots, G_t\}$ is non-degenerate if for all $1 \leq i \leq t$, there exists $1 \leq j \leq t$ such that: $G_i \not\subseteq G_j$.

Definition 12—Let $m \geq 2$, $t \leq 2$ be integers and $\mathcal{H}$ be a set-system. We shall say that $\mathcal{H}$ has t-wise restricted intersections modulo m if the following two conditions hold:

1. $\forall H \in \mathcal{H}$  $|H| = 0 \bmod m$,

2. $\forall$ t' satisfying $2 \leq t' \leq t$, and $\forall H_1, H_2, \ldots, H_{t'} \in \mathcal{H}$ with $\{H_1, H_2, \ldots, H_{t'}\}$ non-degenerate, it holds that:

$$\left|\bigcap_{\tau=1}^{t'} H_\tau\right| \neq 0 \bmod m.$$

Proposition 13—Let $l \geq 2$ be an integer, and $m = \prod_{i=1}^{r} p_i^{\alpha_i}$ be a positive integer with $r > 1$ different prime divisors such that $\forall i \in \{1, \ldots, r\}$: $p_i > 1$. Suppose there exists an integer $t \geq 2$ and a uniform set-system $\mathcal{G}$ satisfying the conditions:

1. $\forall G \in \mathcal{G}$ : $|G| = 0 \bmod m$,

2. $\forall$ t' such that $2 \leq t' \leq t$, and for all distinct $G_1, G_2, \ldots, G_{t'} \in \mathcal{G}$, it holds that:

$$\left|\bigcap_{\tau=1}^{t'} G_\tau\right| = \mu \bmod m,$$

where $\mu \neq 0 \bmod m$ and $\forall i \in \{1, \ldots, r\}$: $\mu_i \in \{0,1\} \bmod p_i$, 3. $|\cap_{G \in \mathcal{G}} \mathcal{G}| \neq 0 \bmod m$.

Then there exists a set-system $\mathcal{H}$, that is explicitly constructible from the set-system $\mathcal{G}$ such that: [label=( )]

1. $\forall H_1, H_2 \in \mathcal{H}$, either $|H_1| = |H_2|$, $|H_1| = l|H_2|$ or $l|H_1| = |H_2|$, 2. $\mathcal{H}$ has t-wise restricted intersections modulo m (see Definition 12).

Proof Starting with 1 uniform (i.e., all member sets have equal size) set systems $\mathcal{H}_1, \mathcal{H}^2, \ldots \mathcal{H}_l$ satisfying the following properties:

1. $\forall H^{(i)} \in \mathcal{H}_i$: $|H^{(i)}| = 0 \bmod m$, $\forall$ t' such that $2 \leq t' \leq \leq t$, and for all distinct $H_1^{(i)}, H_2^{(i)}, \ldots, H_{t'}^{(i)}, \in \mathcal{H}_i$, it holds that:

$$\left|\bigcap_{\tau=1}^{t'} H_\tau^{(i)}\right| = \mu \bmod m,$$

where $\mu \neq 0 \bmod m$ and $\forall z \in \{1, \ldots, r\}$: $\mu \in \{0,1\} \bmod p_z$, 3. $\forall i \in \{1, \ldots, l\}$: $|\cap_{H^{(i)} \in \mathcal{H}_i} H^{(i)}| \neq 0 \bmod m$, 4. $|H^{(i)}| = |H^{(j)}|$ for all $H^{(i)} \in \mathcal{H}_i$, $H^{(j)} \in \mathcal{H}_j$;

5. $\forall i,j \in \{1, \ldots, l\}$: $|\cap_{H^{(i)} \in \mathcal{H}_i} H^{(i)}| = |\cap_{H^{(j)} \in \mathcal{H}_j} H^{(j)}|$.

The following bijection is fixed:

$$f_{i,j}: \bigcap_{H^{(i)} \in \mathcal{H}_i} H^{(i)} \to \bigcap_{H^{(j)} \in \mathcal{H}_j} H^{(j)},$$

such that $f_{i,i}$ is the identity and $f_{i,j} \circ f_{j,k} = f_{i,k}$ for all $1 \leq i,j,k \leq l$. Using these bijections, the sets $\cap_{H^{(i)} \in \mathcal{H}_i} H^{(i)}$ and $\cap_{H^{(j)} \in \mathcal{H}_j} H^{(j)}$ are identified with each other. Let:

$$A = \bigcap_{H^{(1)} \in \mathcal{H}_1} H^{(1)} = \bigcap_{H^{(2)} \in \mathcal{H}_2} H^{(2)} = \ldots = \bigcap_{H^{(l)} \in \mathcal{H}_l} H^{(l)}.$$

The elements of the sets in $\mathcal{H}_i$ are treated as being distinct from the elements of the sets $\mathcal{H}_j$, except for the above identification of elements in $\cap_{H^{(i)} \in \mathcal{H}_i} H^{(i)}$ with elements in $\cap_{H^{(j)} \in \mathcal{H}_j} H^{(j)}$. Let $\alpha = |A|$, and let $\beta_1, \beta_2, \ldots, \beta_{(l-1)\alpha}$ be elements that are distinct from all the elements in the sets in $\mathcal{H}_1, \mathcal{H}_2, \ldots \mathcal{H}_l$. Define the following set:

$$B = \{\beta_1, \beta_2, \ldots, \beta_{(l-1)\alpha}\},$$

and consider a set system $\mathcal{H}$ for which the following two conditions hold:

for some $i \in [l]$: $H^{(i)} \sqcup \mathcal{H}$, where $H^{(i)} \in \mathcal{H}_i$, $(\cup_{i=1}^l H^{(i)} \cap B) \in \mathcal{H}$, where $H^{(i)} \in \mathcal{H}_i$.

The common size of the sets in the uniform set systems $\mathcal{H}_i$ ($1 \leq i \leq l$) are written as km for some $k > 0$. Then, the following holds for all $H^{(i)} \in \mathcal{H}_i$, $$\left|\bigcup_{i=1}^l H^{(i)} \cup B\right| = \left|\bigcup_{i=1}^l H^{(i)}\right| + |B| = \sum_{i=1}^l |H^{(i)}| - (l-1)|A| + |B| = l(km) - (l-1)a + (l-1)a = lkm,$$

where the second equality comes from the fact that $H^{(i)} \cap H^{(j)} = A$ for all $i \neq j$. This proves that Condition 13 holds. Moving on to the Condition 13: let $t_1, t_2, \ldots, t_{l+1} \geq 0$ be such that $2 \leq t'(= t_1 + t_2 + \ldots + t_{l+1}) \leq t$. We shall consider the intersection of the sets:

$H_\tau^{(i)}$ where $1 \leq i \leq l$, $1 \leq \tau \leq t_i$ and $H_\tau^{(i)} \in \mathcal{H}_i$, $\cup_{i=1}^l H'^{(i)}_\tau \cap B$ where $1 \leq \tau \leq t_{l+1}$ and $H'^{(i)}_\tau \in \mathcal{H}_i$.

Assume that these sets form a non-degenerate family. Let:

$$\sigma = \left| \bigcap_{i=1}^{l} \bigcap_{\tau=1}^{t_i} H_\tau^{(i)} \cap \bigcap_{\tau=1}^{t_{l+1}} (H_\tau'^{(1)} \cup H_\tau'^{(2)} \cup \ldots \cup H_\tau'^{(l)} \cup B) \right| =$$

$$\left| \bigcap_{i=1}^{l} \bigcap_{\tau=1}^{t_i} H_\tau^{(i)} \cap \bigcap_{\tau=1}^{t_{l+1}} (H_\tau'^{(1)} \cup H_\tau'^{(2)} \cup \ldots \cup H_\tau'^{(l)}) \right| + \epsilon |B|,$$

where $\epsilon=1$ if $t_1=t_2=\ldots=t_l=0$, and $\epsilon=0$ otherwise. If two or more of $t_1, t_2, \ldots, t_l$ are non-zero, then: $\sigma=|A|=a\neq 0 \mod m$. On the other hand, if exactly one of $t_1, t_2, \ldots, t_l$ is non-zero, then:

$$\sigma = \left| \bigcap_{\tau=1}^{t_i} H_\tau^{(i)} \cap \bigcap_{\tau=1}^{t_{l+1}} H_\tau'^{(i)} \right| \neq 0 \mod m.$$

Since $H_\tau^{(i)}$ (for $1 \leq \tau \leq t_i$) and $H'_\tau^{(i)}$ (for $1 \leq \tau \leq t_{l+1}$) are not all the same by the assumption of non-degeneracy. If $t_1 = t_2 = \ldots = t_l = 0$, then we get:

$$\sigma = \left| \bigcap_{\tau=1}^{t_{l+1}} (H_\tau'^{(1)} \cup H_\tau'^{(2)} \cup \ldots \cup H_\tau'^{(l)}) \right| + |B| =$$

$$\sum_{i=1}^{l} \left| \bigcap_{\tau=1}^{t_{l+1}} H_\tau'^{(i)} \right| - (l-1)|A| + |B| = \sum_{i=1}^{l'} \mu_i \mod m,$$

for some integer l' such that $1 \leq l' \leq l$, and some set $\{\mu_i\}_{i=1}^{l'}$ such that for each $\mu_i$ and all primes p such that p|m, it holds that: $\mu_i \in \{0,1\} \mod p$. Since $\mu_i \neq 0 \mod m$ for all $1 \leq i \leq l'$, there must be some prime factor p of m for which at least one of the $\mu_i$'s satisfy $\mu_i = 1 \mod p$. Since p is a prime factor of m, it satisfies: $p > l \geq l'$. Hence, for p, we get:

$$\sigma = \sum_{i=1}^{l'} \mu_i \neq 0 \mod p.$$

This proves Condition 13, and hence completes the proof.

Remark—Suppose that $|\mathcal{G}|=s$ and that the number of elements in the universe of $\mathcal{G}$ is g. Then, there are ls sets of size km and $s^l$ sets of size lkm in $\mathcal{H}$. Therefore, we get: $|\mathcal{H}|=s^l+ls$. The universe of $\mathcal{H}$ has lg elements, and for each $H \in \mathcal{H}$, exactly one of the following is true:

H is a proper subset of exactly $s^{l-1}$ sets and not a proper superset of any sets in $\mathcal{H}$, H is a proper superset of exactly l sets and not a proper subset of any sets in $\mathcal{H}$.

In order to explicitly construct set systems which, in addition to having the properties in Proposition 13, have sizes superpolynomial in the number of elements, the following is used to construct a superpolynomial uniform set-system.

Theorem 14—Let $\{\alpha_i\}_{i=1}^r$ be r>1 positive integers and $m=\Pi_{i=1}^r p_i^{\alpha_i}$ be a positive integer with r different prime divisors: $p_1, \ldots, p_r$. For every integer $n \geq 1$, there exists an explicitly constructible polynomial P in n variables such that
1. P(0, 0, \ldots, 0)=0 mod m,
2. $P(x) \cdot 0$ for all $x \in \{0,1\}^n$ such that $x \neq (0, 0, \ldots, 0)$, 3. $\forall i \in [r]$ and $\forall x \in \{0,1\}^n$ such that $x \neq (0, 0, \ldots, 0)$, it holds that: $P(x) \in \{0,1\} \mod p_i$.

The polynomial P has degree $d = \max(p_1^{e_1}, \ldots, p_r^{e_r}) - 1$ where $e_i$ ($\forall i \in [r]$) is the smallest integer that satisfies $p_i^{e_i} > \lceil n^{1/r} \rceil$. Define $Q(x_1, x_2, \ldots, x_n) = P(1-x_1, 1-x_2, \ldots, 1-x_n)$. Then:
1. Q (1, 1, \ldots, 1)=0 mod m,
2. $Q(x) \neq 0 \mod m$ for all $x \in \{0,1\}^n$ such that $x \neq (1, 1, \ldots, 1)$.
3. $\forall i \in [r]$ and $\forall x \in \{0,1\}^n$ such that $x \neq (1, 1, \ldots, 1)$, it holds that: $Q(x) \in \{0,1\} \mod p_i$.

Theorem 15—Let $\{\alpha_i\}_{i=1}^r$ be r>1 positive integers and $m=\Pi_{i=1}^r p_i^{\alpha_i}$ be a positive integer with r different prime divisors: $p_1, \ldots, p_r$. For every integer $n \geq 1$, there exists a uniform set system $\mathcal{G}$ over a universe of g elements which is explicitly constructible from the polynomial Q of degree d such that
1.

$$g < \frac{2(m-1)n^{2d}}{d!} \text{ if } n \geq 2d,$$

2. $|\mathcal{G}|=n^n$,
3. $\forall G \in \mathcal{G}$, $|G|=0 \mod m$,
4. $\forall G, H \in \mathcal{G}$ such that $G \neq H$, it holds that: $|G \cap H| = \mu \mod m$, where $\mu \neq 0 \mod m$ and $\mu \in \{0,1\} \mod p_i$ for all $i \in [r]$,
5. $|\bigcap_{G \in \mathcal{G}} G| \neq 0 \mod m$.

Note that Theorem 15 follows from the fact that the following holds in Grolmusz's construction of superpolynomial set-systems:

$$\left| \bigcap_{G \in \mathcal{G}} G \right| = Q(0, 0, \ldots, 0) \neq 0 \mod m.$$

Theorem 16—Let $\{\alpha_i\}_{i=1}^r$ be r>1 positive integers and $m=\Pi_{i=1}^r p_i^{\alpha_i}$ be a positive integer with r different prime divisors: $p_1, \ldots, p_r$. For all integers $t \geq 2$ and $n \geq 1$, there exists a uniform set system $\mathcal{G}$ over a universe of g elements which is explicitly constructible from the polynomial Q of degree d such that
1.

$$g < \frac{2(m-1)n^{2d}}{d!} \text{ if } n \geq 2d,$$

2. $|\mathcal{G}|=n^n$,
3. $\forall G \in \mathcal{G}$, $|G|=0 \mod m$,
4. $\forall t'$ such that $2 \leq t' \leq t$, and for all distinct $G_1, G_2, \ldots, G_{t'} \in \mathcal{G}$, it holds that:

$$\left| \bigcap_{\tau=1}^{t'} G_\tau \right| = \mu \mod m,$$

where $\mu \neq 0 \mod m$ and $\mu \in \{0,1\} \mod p_i$ for all $i \in [r]$,

5. $|\cap_{G \in \mathcal{G}} G| \not\equiv 0 \bmod m$.

Proof: Write the polynomial Q as $$Q(x_1, x_2, \ldots, x_n) = \sum_{i_1 < i_2 < \ldots < i_l} a_{i_1, i_2, \ldots, i_l} x_{i_1} x_{i_2} \ldots x_{i_l}$$

Define $$\tilde{Q}(x_1, x_2, \ldots, x_n) = \sum_{i_1 < i_2 < \ldots < i_l} \tilde{a}_{i_1, i_2, \ldots, i_l} x_{i_1} x_{i_2} \ldots x_{i_l}$$

where $\tilde{a}_{i_1, i_2, \ldots, i_l}$ is the remainder when $a_{i_1, i_2, \ldots, i_l}$ is divided by m.

Let $[0, n-1] = \{0, 1, \ldots, n-1\}$. Define the function $\delta: [0, n-1]^t \to \{0, 1\}$ as $$\delta(u_1, u_2, \ldots, u_t) = \begin{cases} 1 & \text{if } u_1 = u_2 = \ldots = u_t \\ 0 & \text{otherwise} \end{cases}.$$

For $y_1, y_2, \ldots y_t \in [0, n-1]^n$, let $$a^{y_1, y_2, \ldots, y_t} = \tilde{Q}(\delta(y_{1,1}, y_{2,1}, \ldots, y_{t,1}), \ldots, \delta(y_{1,n}, y_{2,n}, \ldots, y_{t,n})) \bmod m.$$

Then $$a^{y_1, y_2, \ldots y_t} = \sum b_{i_1, i_2, \ldots, i_l}^{y_1, y_2, \ldots, y_t}$$

where $$b_{i_1, i_2, \ldots, i_l}^{y_1, y_2, \ldots y_t} = \prod_{j=1}^{l} \delta(y_{1, i_j}, y_{2, i_j}, \ldots, y_{t, i_j}).$$

Each summand $b_{i_1, i_2, \ldots, i_l}^{y_1, y_2, \ldots, y_t}$ corresponds to a monomial of $\tilde{Q}$ and occurs with multiplicity $\tilde{a}_{i_1, i_2, \ldots, i_l}$ in the above sum.

It can be checked that there exists partitions $\mathcal{P}_{i_1, i_2, \ldots, i_l}$ of $[0, n-1]^n$ such that for all $y_1, y_2, \ldots, y_t \in [0, n-1]^n$, $$b_{i_1, i_2, \ldots, i_l}^{y_1, y_2, \ldots y_t} = \begin{cases} 1 & \text{if } y_1, y_2, \ldots, y_t \text{ belong to the same block of } \mathcal{P}_{i_1, i_2, \ldots, i_l} \\ 0 & \text{otherwise} \end{cases},$$

and that the equivalence classes defined by the partition $\mathcal{P}_{i_1, i_2, \ldots, i_l}$ each has size $n^{n-l}$. We say that a block in the partition $\mathcal{P}_{i_1, i_2, \ldots, i_l}$ covers $y \in [0, n-1]^n$ if y is an element of the block.

A set system $\mathcal{G}$ is defined as follows: the sets in $\mathcal{G}$ correspond to y for $y \in [0, n-1]^n$, and the set corresponding to y has elements given by the blocks that cover y.

The set y in the set system $\mathcal{G}$ has size equal to the number of blocks that cover y, which is equal to $$a^{y, y, \ldots, y} = \tilde{Q}(1, 1, \ldots, 1) \not\equiv 0 \bmod m.$$

For any $2 \leq t' \leq t$ and $y_1, y_2, \ldots y_{t'} \in [0, n-1]^n$ distinct, some block of $\mathcal{P}_{i_1, i_2, \ldots, i_l}$ covers all of $y_1, y_2, \ldots y_{t'}$ if and only if $b_{i_1, i_2, \ldots, i_l}^{y_1, y_2, \ldots, y_{t'}, \ldots, y_{t'}} = 1$ (note that $y_{t'}$ occurs in the superscript $t - t' + 1$ times). Hence, the number of such blocks is equal to:

$$a^{y_1, y_2, \ldots, y_{t'}, \ldots, y_{t'}} \not\equiv 0 \bmod m.$$

Finally, a bound on g is the number of elements in the universe of $\mathcal{G}$. This construction is equal to the number of blocks. Since the partition $\mathcal{P}_{i_1, i_2, \ldots, i_l}$ it defines $n^l$ equivalence classes, the number of blocks is given by $$g = \sum_{i_1 < i_2 < \ldots < i_l} \tilde{a}_{i_1, i_2, \ldots, i_l} n^l \leq \sum_{l=0}^{d} \binom{n}{l}(m-1)n^l < (m-1) \sum_{l=0}^{d} \frac{n^{2l}}{l!} < \frac{2(m-1)n^{2d}}{d!},$$

provided that $n \geq 2d$.

Theorem 17—Let $\{\alpha_i\}_{i=1}^r$ be $r > 1$ positive integers and $m = \prod_{i=1}^{r} p_i^{\alpha_i}$ be a positive integer with r different odd prime divisors: $p_1, \ldots, p_r$, and $l \geq 2$ be an integer such that $l < \min(p_1, \ldots, p_r)$. Then, for all integers $t \geq 2$ and $n \geq 1$, there exists an explicitly constructible non-uniform set-system $\mathcal{H}$, defined over a universe of h elements, such that

1.

$$h < 2l(m-1)n^{4mn^{\frac{1}{r}}}$$

if $$n \geq (4m)^{1 + \frac{1}{r-1}},$$

2. $|\mathcal{H}| = n^{ln} + \ln^n$,
3. $\forall H_1, H_2 \in \mathcal{H}$, either $|H_1| = |H_2|$, $|H_1| = l|H_2|$ or $|H_1| = |H_2|$,
4. $\mathcal{H}$ has t-wise restricted intersections modulo m.

Proof. By Theorem 16, there exists a uniform set-system $\mathcal{G}$ that satisfies conditions 1-3 of Proposition 13, and is defined over a universe of g elements, such that $|\mathcal{G}| = n^n$. Furthermore we know that $$g < \frac{2(m-1)n^{2d}}{d!}$$

provided the condition $n \geq 2d$ is satisfied. From Theorem 14, $d = \max(p_1^{e_1}, \ldots, p_r^{e_r}) - 1$ where $e_i$ is the smallest integer that satisfies $p_i^{e_i} > \lceil n^{1/r} \rceil$, from which we obtain the following inequality:

$$d < \max(p_1, \ldots, p_r) \lceil n^{1/r} \rceil < 2mn^{1/r}.$$

Hence if $$n \geq (4m)^{1 + \frac{1}{r-1}},$$

then $$n^{\frac{r-1}{r}} \geq 4mn \geq 4mn^{1/r} > 2d,$$

and thus we have:

$$g < \frac{2(m-1)n^{2d}}{d!} < 2(m-1)n^{2d} < 2(m-1)n^{4mn^{\frac{1}{r}}}.$$

Applying Proposition 13 with the set-system $\mathcal{G}$, a set-system $\mathcal{H}$ is obtained that satisfies Conditions 3 and 4. The size of $\mathcal{H}$ is:

$$|\mathcal{H}| = (n^n)^l + l(n^n) = n^{ln} + ln^n,$$

and the number of elements in the universe of $\mathcal{H}$ is $$h = lg < 2l(m-1)n^{4mn^{\frac{1}{r}}}$$

for $$n \geq (4m)^{1+\frac{1}{r-1}}.$$

Corollary 18—Let $\{\alpha_i\}_{i=1}^{r}$ be $r > 1$ positive integers and $m = \Pi_{i=1}^{r} p_i^{\alpha_i}$ be a positive integer with r different odd prime divisors: $p_1, \ldots, p_r$, and $l \geq 2$ be an integer such that $l < \min(p_1, \ldots, p_r)$. Then, there exists $c > 0$ such that for all integers $t \geq 2$ and $h \geq lm$, there exists an explicitly constructible non-uniform[1] set-system $\mathcal{H}$, defined over a universe of h elements, such that 1.
$$|\mathcal{H}| > \exp\left(c \frac{l(\log h)^r}{(\log\log h)^{r-1}}\right) + l\exp\left(c \frac{(\log h)^r}{(\log\log h)^{r-1}}\right),$$

2. $\forall H \in \mathcal{H} : |H| \equiv 0 \mod m$,
3. $\forall H_1, H_2 \in \mathcal{H}$, either $|H_1| = |H_2|$, $|H_1| = l|H_2|$ or $|H_1| = |H_2|$,
4. $\forall H_1, H_2 \in \mathcal{H}$, where $H_1 \neq H_2$: if $H_2 \subset H_1$ or $H_1 \subset H_2$, then $|H_1 \cap H_2| \equiv 0 \mod m$, else $|H_1 \cap H_2| \not\equiv 0 \mod m$,

[1] member sets do not all have equal size

5. $\mathcal{H}$ has t-wise restricted intersections modulo m.

Proof. For small values of h, we can simply take $\mathcal{H}$ to be the set system $$\mathcal{H} = \{\{1, 2, \ldots, m\}, \{m, m+1, \ldots, 2m-1\}, \{1, 2, 3, \ldots, lm\}\},$$

so it is enough to prove the statement for sufficiently large h. Choose n as large as possible subject to the restriction $$2l(m-1)n^{4mn^{\frac{1}{r}}} \leq h.$$

It is assumed that h is sufficiently large so that the condition $$n \geq (4m)^{1+\frac{1}{r-1}}$$

is satisfied. For $N = n+1$, it holds that:

$$h < 2l(m-1)N^{4mN^{\frac{1}{r}}} \quad N > e^{rW_0\left(\frac{1}{4rm}\log \frac{h}{2l(m-1)}\right)},$$

where $W_0$ is the principal branch of the Lambert W function. Fix any $c_1$ such that $$0 < c_1 < \frac{1}{4rm}.$$

Then for h sufficiently large, $n > e^{rW_0(c_1 \log h)}$ and:

$$W_0(x) = \log x - \log\log x + o(1),$$

hence, it follows that there exists some $c_2$ such that for all sufficiently large h, it holds that:

$$n > \exp(r\log\log h - r\log\log\log h + c_2) = \frac{e^{c_2}(\log h)^r}{(\log\log h)^r}.$$

This shows that there exists $c_3 > 0$ such that for sufficiently large h, we get:

$$n^n > \exp\left(\frac{c_3(\log h)^r}{(\log\log h)^{r-1}}\right). \quad (1)$$

Since the size of $\mathcal{H}$ is $|\mathcal{H}| = n^{ln} + ln^n$, it follows from Equation 1 that:

$$|\mathcal{H}| > \exp\left(c \frac{l(\log h)^r}{(\log\log h)^{r-1}}\right) + l\exp\left(c \frac{(\log h)^r}{(\log\log h)^{r-1}}\right)$$

From the set system $\mathcal{H}$, a covering vector family $\mathcal{V}$ follows.

Definition 19 (Covering Vectors)—Let m, h > 0 be positive integers, $S \subseteq \mathbb{Z}_m \setminus \{0\}$, and $w(\cdot)$ and $\langle \cdot, \cdot \rangle$ denote Hamming weight and inner product, respectively. We say that a subset $\mathcal{V} = \{v_i\}_{i=1}^{N}$ of vectors in $(\mathbb{Z}_m)^h$ forms an S-covering family of vectors if the following two conditions are satisfied:

$\forall i \in [N]$, it holds that: $\langle v_i, v_i \rangle = 0 \mod m$,
$\forall i, j \in [N]$, where $i \neq j$, it holds that:

$$\langle v_i, v_j \rangle \mod m = \begin{cases} 0 & \text{if } w(v_i \circ v_j \mod m) = 0 \mod m \\ \in S & \text{otherwise} \end{cases},$$

where $\circ$ denotes Hadamard/Schur product (see Definition 1).

Recall that h, m, l are positive integers such that $2 \leq l < \min(p_1, \ldots, p_r)$ and $m = \Pi_{i=1}^{r} p_i^{\alpha_i}$ has $r > 1$ different prime divisors: $p_1, \ldots, p_r$. Further, it follows that the sizes of the pairwise intersections of the sets in $\mathcal{H}$ occupy at most $m-1$ residue classes modulo m. If each set $H_i \in \mathcal{H}$ is represented by a representative vector $v_i \in (\mathbb{Z}_m)^h$, then for the resulting subset $\mathcal{V}$ of vectors in $(\mathbb{Z}_m)^h$, the following result follows from Corollary 18.

Corollary 20—For the set-system $\mathcal{H}$ defined in Corollary 18, if each set $H_i \in \mathcal{H}$ is represented by a unique vector $v_i \in (\mathbb{Z}_m)^h$, then for a set S of size $m-1$, the set of vectors $V = \{v_i\}_{i=1}^{N}$, formed by the representative vectors of all sets in $\mathcal{H}$, n S-covering family such that $$N > \exp\left(c \frac{l(\log h)^r}{(\log\log h)^{r-1}}\right) + l\exp\left(c \frac{(\log h)^r}{(\log\log h)^{r-1}}\right)$$

and $\forall i, j [N]$ it holds that $\langle v_i, v_j \rangle = |H_i \cap H_j| \mod m$.

Vector families and special inner products can be used to work with sets from different set-systems. The following two properties hold for all sets in any set-system H that is defined by Corollary 18.

H is a proper subset of exactly $s^{l-1}$ sets and not a proper superset of any sets in $\mathcal{H}$, H is a proper superset of exactly 1 sets and not a proper subset of any sets in $\mathcal{H}$, where $$s \geq \exp\left(c \frac{(\log h)^r}{(\log\log h)^{r-1}}\right).$$

Let $V \subseteq (\mathbb{Z}_m)^h$ be a family of covering vectors, consisting of representative vectors for the sets in a set-system $\mathcal{H}$ (defined modulo m). For all $i \in |\mathcal{H}|(=|V|)$, let $v_i \in V$ denote the representative vector for the set $H_i \in \mathcal{H}$. Recall from Corollary 20 that the following holds:

$$\langle v_i, v_j \rangle = |H_i \cap H_j| \bmod m.$$

A k-multilinear form on $V^k$ is defined as:

$$\langle v_1, v_2, \ldots, v_k \rangle_k = \sum_{i=1}^{h} v_1[i] v_2[i] \ldots v_k[i]$$

A representative vector $v \in \mathcal{V}$ is defined for a fixed set $H \in \mathcal{H}$. For the rest of the sets $H_i \in \mathcal{H}$, their respective representative vectors are denoted by $v_i \in \mathcal{V}$. Let $v, v_1, v_2 \in \mathcal{V}$, and $v_{i \cap j} \in \mathcal{V}$ denote the representative vector for the set $H_{i \cap j} = H_i \cap H_j$. Then, the following holds:

$$\langle v, v_{1 \cup 2} \rangle = |H \cap (H_1 \cup H_2)| = |(H \cap H_1) \cup (H \cap H_2)| \quad (2)$$

$$= |H \cap H_1| + |H \cap H_2| - |H \cap H_1 \cap H_2|$$

$$= \langle v, v_1 \rangle + \langle v, v_2 \rangle - \langle v, v_1, v_2 \rangle_3.$$

Define F as:

$$F(x,y,z) = x + y - z,$$

i.e., the following holds:

$$F(\langle v, v_1 \rangle, \langle v, v_2 \rangle, \langle v, v_1, v_2 \rangle_3) = \langle v, v_{1 \cup 2} \rangle$$

Note that the following also holds:

$$|H \cap (H_1 \cap H_2)| = \langle v, v_1 \rangle + \langle v, v_2 \rangle - \langle v, v_{1 \cup 2} \rangle$$

$$= |H \cap H_1| + |H \cap H_2| - |H \cap (H_1 \cup H_2)|.$$

Consider the following simple extension of Equation 2:

$$\langle v, v_1, v_{2 \cup 3} \rangle_3 = |H \cap H_1 \cap (H_2 \cap H_3)|$$

$$= |(H \cap H_1 \cap H_2) \cup (H \cap H_1 \cap H_3)|$$

$$= |H \cap H_1 \cap H_2| + |H \cap H_1 \cap H_3| - |H \cap H_1 \cap H_2 \cap H_3|$$

$$= \langle v, v_1, v_2 \rangle_3 + \langle v, v_1, v_3 \rangle_3 - \langle v, v_1, v_2, v_3 \rangle_4.$$

The extension yields:

$$F(\langle v, v_1, v_2 \rangle_3, \langle v, v_1, v_3 \rangle_3, \langle v, v_1, v_2, v_3 \rangle_4) = \langle v, v_1, v_{2 \cup 3} \rangle_3.$$

Note that the following also holds:

$$|H \cap (H_1 \cap H_2 \cap H_3)| = \langle v, v_1, v_2 \rangle_3 + \langle v, v_1, v_3 \rangle_3 - \langle v, v_1, v_{1 \cup 2} \rangle_4$$

$$= |H \cap H_1 \cap H_2| + |H \cap H_1 \cap H_3| -$$

$$|H \cap H_1 \cap (H_2 \cup H_3)|.$$

It follows by extension that $\langle v, v_{1 \cup 2 \cup \ldots \cup w} \rangle_w$ can be computed from the k-multilinear forms $\langle v_1, v_2, \ldots, v_k \rangle_k$, for all $k \in [w+1]$ and all $v_i \in \mathcal{V}$. Hence, $$\langle v_i, v_j \rangle = |H_i \cap H_j| \bmod m$$

allows computation of the intersection of any sets $H_i, H_j \in \mathcal{H}$, such that two vectors $v_i, v_j$ of a covering vector family $\mathcal{V}$ of the set-system $\mathcal{H}$ represent two sets $H_i, H_j$ of the set-system $\mathcal{H}$ and have an inner product $\langle v_i, v_j \rangle$ equal to a multiple of a non-prime integer m when the size of the intersection ($|H_i \cap H_j|$) of the sets $H_i, H_j$ represented by the two vectors $v_i, v_j$ is a multiple of the non-prime integer m. Further, being able to compute the aforementioned function F(x, y, z) allows computation of unions and intersections of any arbitrary number of sets from $\mathcal{H}$.

An example fully homomorphic encryption system is supported by the foregoing description and drawings, and by the following. The example fully homomorphic encryption system supports both addition operations and multiplication operations of operation-compatible ciphertext. Each ciphertext is designated as "addition compatible" or "multiplication compatible," designations that are mutually incompatible. Hence, an aggregator (the operation and/or entity responsible for homomorphic evaluation of the arithmetic circuit) performs a "gate conversion" between addition compatible ciphertext and multiplication compatible ciphertext. It is assumed that all parties are honest. In one implementation, all matrices are square.

Based on the foregoing, for $H \in \mathcal{H}$, if an addition or multiplication gate receives sets $H_a$ and $H_b$ ($1 \leq a, b \leq |\mathcal{H}|$) as inputs, then the output is zero if:

$H_a = H_b$, or $H_a$ is a proper subset of $H_b$ or vice-versa.

Accordingly, if these sets are carefully placed within the various terms, then the sets can be used to remove the error terms to which they are attached. Therefore, the set-systems cancel each other and therefore result in the errors also being canceled after a fixed depth in the evaluation circuit.

A trust vector $v \xleftarrow{\$} \mathcal{V}$ is sampled from the covering vector family $\mathcal{V}$ (a family of representative trust vectors) such that the set $H \in \mathcal{H}$ represented by v has $s^{l-1}$ proper supersets in $\mathcal{H}$. Recall that s is superpolynomial w.r.t. h and r. An error E is randomly sampled from a cyclic generator set $\mathfrak{S}$ for module M, which is used to define the CLWE distribution. Party $P_b$ ($b \in \{0,1\}$) is provided with $\{E, A_0, A, x_b\}$, where $x_b = \langle v, v_b \rangle$ for some $v_b \in \mathcal{V}$ such that $H_b \not\subseteq H$ and H $\not\subseteq \mathcal{H}$. The matrices "$A_0$, A" are referred to as "level-specific matrices", the vetors v and $v_b$ are trust vectors, and the term "x" is referred to as an "error canceling variable" or an "error canceling party identifier." An integer q is selected such that m=l$\varphi$(q) and $l^2$ $\varphi$(q)=q.

Party $P_b$ encrypts its plaintext $S_b \in \mathfrak{I}$ and generates addition compatible ciphertext as: $C_a^{(b)}$=$AS_b$+$\langle v, v_b \rangle$ E mod q. Party $P_0$ generates multiplication compatible ciphertext $C_d^{(0)}$ as: $C_d^{(0)}$ $A_0$=$AS_0$+E$\langle v,v_0 \rangle$z,226 mod q, and party $P_1$ generates its multiplication compatible ciphertext as: $C_d^{(1)}$ A=$A_0 S_1$+E$\langle v,v_1 \rangle$ mod q. $C_d^{(b)}$ can be computed via lattice trapdoors. Vectors may be selected from a covering vector family of the set-system, such that the inner product of the vectors equals a multiple of a non-prime integer when the size of the intersection of the sets represented by the two vectors is a multiple of the non-prime integer.

Each level in the circuit has one matrix assigned to it. A is the level 0 matrix. The matrices for all other levels alternate between A and $A_0$. Addition of any two addition compatible ciphertexts is straightforward via simple addition, yielding a result that depends upon the choice of $v_0$ and $v_1$. Multiplication of two compatible ciphertexts can be performed as:

$$C_d^{(1)} C_d^{(0)} A_0 = C_d^{(1)}(AS_0 + E^{\langle v,v_0 \rangle}) \bmod q$$
$$= C_d^{(1)} AS_0 + C_d^{(1)} E^{\langle v,v_0 \rangle} \bmod q$$
$$= A_0 S_1 S_0 + E^{\langle v,v_1 \rangle} S_0 + C_d^{(1)} E^{\langle v,v_0 \rangle} \bmod q.$$

Since $\mathfrak{I}$ is cyclic, the "nature" of the errors remains preserved throughout the multiplication. If $S_0$=E$\langle v,v_z \rangle$ for some randomly sampled $v_z \mathfrak{I} \mathcal{V}$, then the errors get reduced in the desired manner.

Each multiplication and addition operation can occur only between compatible ciphertexts. Since the matrices $A_0$ and A are different, ciphertexts at each level of the circuit are multiplication compatible. Hence, after level 0, the aggregator must perform "gate conversions", i.e., transforming multiplication compatible ciphertext to addition compatible ciphertext. This can be easily carried out by performing component wise product of the multiplication compatible ciphertext with Â, where Â$A_0$=A mod q. Converting addition compatible ciphertext to multiplication compatible cyphertext can be accomplished by computing the component-wise product of the appropriate short matrix.

The set-system $\mathcal{H}$ can also provide support for general access structures in which parties do not rely on shared keys to carry out fully homomorphic encryption computations of ciphertext. Instead, general access structures allow for distributing shares of a secret such that any authorized subset of secret holders, as specified by the general access structure, can recompute the secret and therefore decrypt corresponding ciphertext. Such general access structures are monotone (e.g., if a subset of parties A belongs to the general access structure and if A is a subset of another set of parties B, then B also belongs to the general access structure, and hence is also authorized to recompute the secret).

It follows directly from the description of the vector families and special inner products provided herein that in a setting with more than two parties, $x_b$ can be generated such that it holds for any authorized subset of parties $\mathcal{A}$ that the set represented by $\Sigma_{i \in} \mathcal{A} v_i$ in $\Sigma_{i \in} \mathcal{A} x_i$=$\langle v, v_i \rangle$, is always a superset of H$\in$ $\mathcal{H}$ that is represented by v$\in$ $\mathcal{V}$. Similarly, $x_b$ can be generated such that it holds for all unauthorized subsets $\mathcal{B}$ represented by $\Sigma_{i \in} \mathcal{B} v_i$ is never a superset (or subset) of v. In such a setting, errors get canceled if some authorized subset of parties collaborates, and errors do not get canceled if an unauthorized subset of parties collaborates. Accordingly, parties belonging to certain authorized subsets can successfully decrypt the ciphertext output of the evaluation circuit, and parties not belonging to these subsets cannot.

Figure 2:
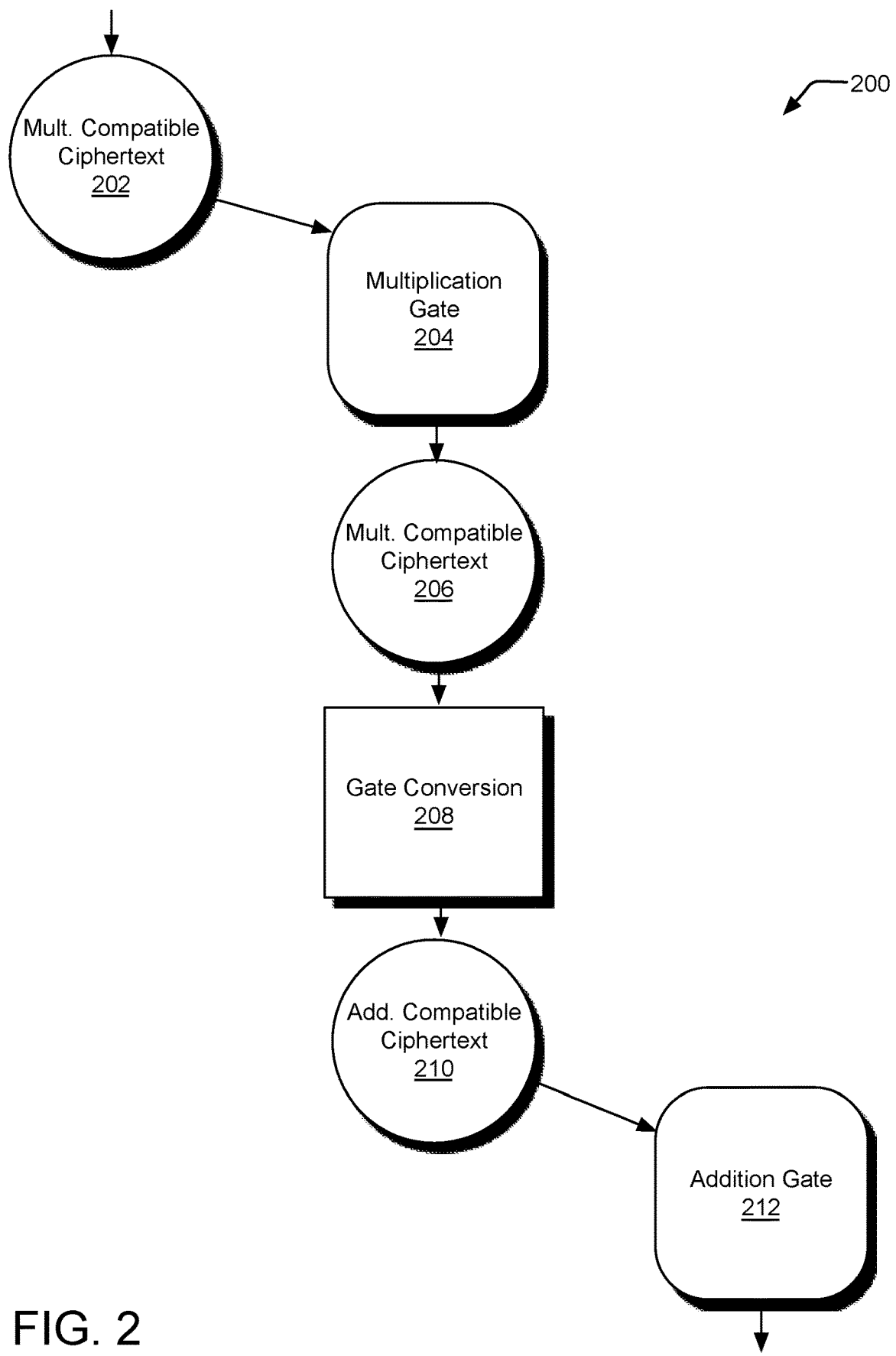
FIG. 2 illustrates an example flow through a homomorphic evaluation circuit.

FIG. 2 illustrates an example flow 200 through a homomorphic evaluation circuit. As previously discussed, each multiplication and addition operation can occur only between compatible ciphertexts. Since the matrices $A_0$ and A are different, ciphertexts at each level of the circuit are multiplication compatible. Hence, after level 0, the aggregator must perform "gate conversions", i.e., transforming multiplication compatible ciphertext to addition compatible ciphertext. This can be easily carried out by performing component wise product of the multiplication compatible ciphertext with Â, where Â$A_0$=A mod q.

A multiplication compatible ciphertext 202 is received (e.g., as input to a homomorphic evaluation circuit or as an intermediate ciphertext result in the homomorphic evaluation circuit). The multiplication compatible ciphertext 202 is input to a multiplication gate 204 of the evaluation circuit, which outputs multiplication compatible ciphertext 206. Because the next arithmetic operation of the evaluation circuit is an addition gate 212, a gate conversion 208 transforms the multiplication compatible ciphertext 206 to addition compatible ciphertext 210, which is then inputted to the addition gate 212 for computation. Output of the addition gate 212 is passed to a subsequent level of the evaluation circuit or out of the evaluation circuit as a ciphertext result of the evaluation.

Figure 3:
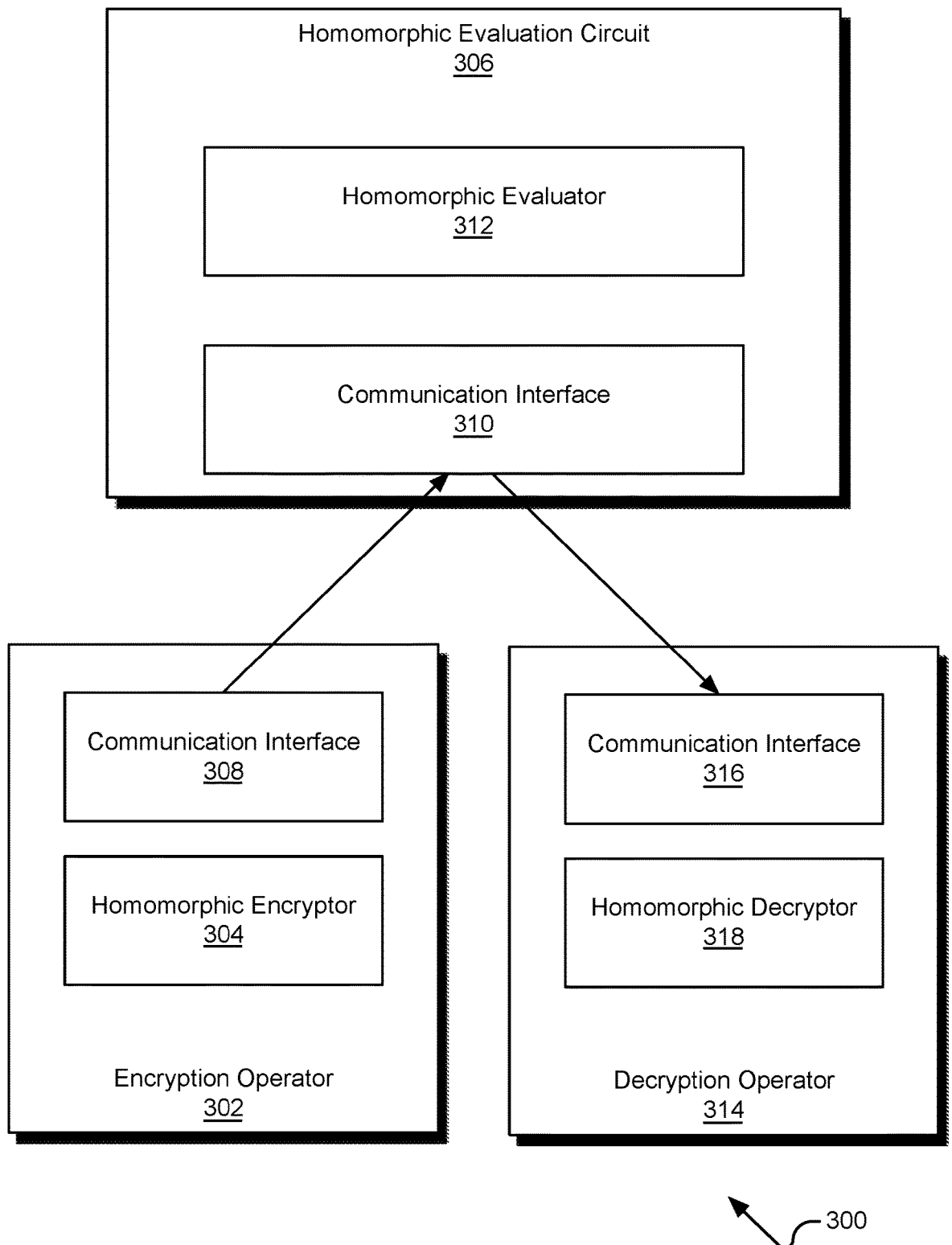
FIG. 3 illustrates example components used in a fully homomorphic encryption system.

FIG. 3 illustrates example components used in a fully homomorphic encryption system 300. An encryption operator 302 receives plaintext input (not shown). A homomorphic encryptor 304 encrypts the plaintext input to yield a homomorphically encrypted ciphertext input, which is communicated to a homomorphic evaluation circuit 306 via a communication interface 308. For its encryption operation, the homomorphic encryptor 304 employs vectors selected from a covering vector family of a set-system having an intersection property for which the inner product of the vectors equals a multiple of a non-prime integer when the size of the intersection of the sets represented by the two vectors is a multiple of the non-prime integer.

The homomorphic evaluation circuit 306 receives the homomorphically encrypted ciphertext input via a communication interface 310. A homomorphic evaluator 312 evaluates the homomorphically encrypted ciphertext input against an arithmetic operation via addition and/or multiplication gates. The evaluation result is generated as homomorphically encrypted ciphertext output, which is communicated to the decryption operator 314 via the communication interface 310. The decryption operator 314 receives the homomorphically encrypted ciphertext output via a communication interface 316. A homomorphic descriptor 318 decrypts the homomorphically encrypted ciphertext output to yield plaintext output (not shown).

FIG. 4 illustrates example operations 400 for evaluating homomorphically encrypted ciphertext. An input operation 402 receives ciphertext input that has been homomorphically encrypted from a plaintext input using a set-system including sets having an intersection property. An evaluation operation 404 evaluates an arithmetic function on the ciphertext input to generate a ciphertext output. The arithmetic function includes one or more additive gates and one or more multiplicative gates. The evaluation operation 404 also generates errors during the evaluation of the arithmetic function, but the intersection property of the set-system cancels out the errors during the evaluation operation 404. An output operation 406 transmits the ciphertext output for homomorphic decryption to generate a plaintext result.

The set-system may be selected that includes sets having an intersection property that cancels out the error during the evaluation, rather than by constraining the operation or performing supplemental error-removal operations. Vectors may be selected from a covering vector family of the set-system, such that the inner product of the vectors equals a multiple of a non-prime integer when the size of the intersection of the sets represented by the two vectors is a multiple of the non-prime integer (an example intersection property). The vectors may be used to homomorphic encrypt plaintext into ciphertext input for the evaluation. Errors generated during the evaluation are then canceled out based on the intersection properties of the set-system used to encrypt the ciphertext input. Also, based on the foregoing, given a level-specific matrix ($A_0$ or A) and its trapdoor, a ciphertext result (output) can be inverted to retrieve a plaintext result (output).

FIG. 5 illustrates example operations 500 for decrypting homomorphically encrypted ciphertext. It should be understood that encrypting homomorphically encrypted ciphertext may also be accomplished using the technology described herein.

A receiving operation 502 receives a ciphertext output of an arithmetic evaluation function. The arithmetic evaluation function has been performed on a ciphertext input homomorphically encrypted from a plaintext input using a set-system including sets having an intersection property. A decrypting operation 504 decrypts the ciphertext output using a summation of two or more noise-canceling party identifiers of two or more authorized parties. The intersection property of the sets cancels out the errors for the two or more authorized parties during the decryption operation. A decryption attempt operation 506 attempts to decrypt the ciphertext output using a summation of one or more noise-canceling party identifiers of one or more unauthorized parties. However, as the intersection property of the sets fails to cancel out the errors for the one or more unauthorized parties during the attempted decryption, the attempted decryption operation fails for the one or more unauthorized parties.

Figure 6:
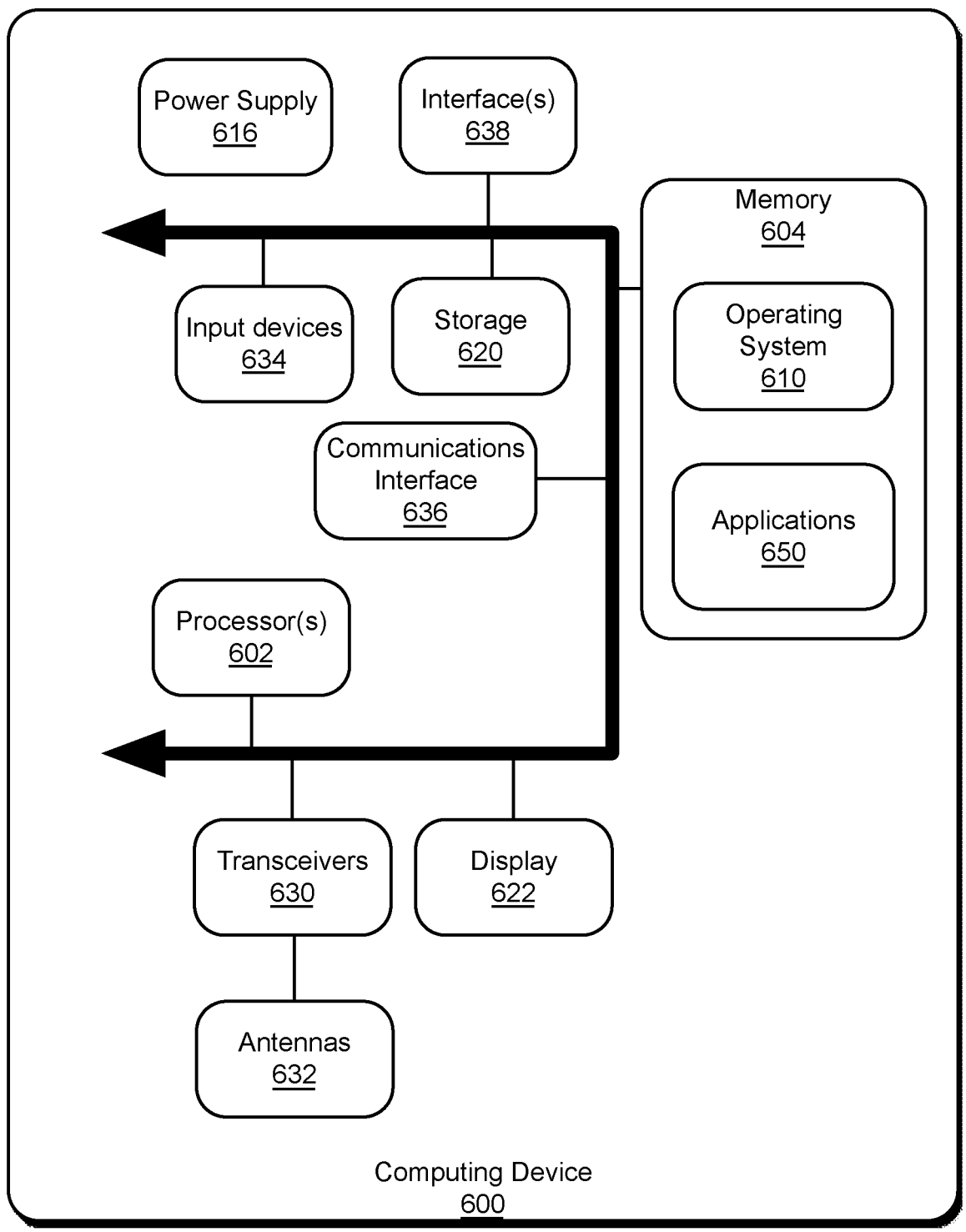
FIG. 6 illustrates an example computing device for implementing the features and operations of the described technology.

FIG. 6 illustrates an example computing device 600 for implementing the features and operations of the described technology. The computing device 600 may embody a remote control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 600 includes one or more hardware processor(s) 602 and a memory 604. The memory 604 generally includes both volatile memory (e.g., RAM) and nonvolatile memory (e.g., flash memory). An operating system 610 resides in the memory 604 and is executed by the hardware processor(s) 602.

In an example computing device 600, as shown in FIG. 6, one or more modules or segments, such as applications 650, a homomorphic evaluator, a homomorphic encryptor, a homomorphic decryptor, a communication interface, and other services, workloads, and modules, are loaded into the operating system 610 on the memory 604 and/or storage 620 and executed by hardware processor(s) 602. The storage 620 may include one or more tangible storage media devices and may store cryptographic security parameters, plain text, ciphertext, device parameters, and other data and may be local to the computing device 600 or may be remote and communicatively connected to the computing device 600.

The computing device 600 includes a power supply 616, which is powered by one or more batteries or other power sources and which provides power to other components of the computing device 600. The power supply 616 may also be connected to an external power source that overrides or recharges the built-in batteries or other power sources.

The computing device 600 may include one or more communication transceivers 630 that may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The computing device 600 may further include a network adapter 636, which is a type of computing device. The computing device 600 may use the adapter and any other types of computing devices for establishing connections over a wide-area network (WAN) or local-area network (LAN). It should be appreciated that the network connections shown are exemplary and that other computing devices and means for establishing a communications link between the computing device 600 and other devices may be used.

The computing device 600 may include one or more input devices 634 such that a user may enter commands and information (e.g., a keyboard or mouse). These and other input devices may be coupled to the server by one or more interfaces 638, such as a serial port interface, parallel port, or universal serial bus (USB). The computing device 600 may further include a display 622, such as a touch screen display.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more hardware processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote control device and/or a physical controlled device 802 implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across multiple user sessions. A service may be available to one or more system components, programs, and/or other services. In some implementations, a service may run on one or more server computing devices.

While this specification contains many specific implementation details, these should not be construed as limitations on the scope of any inventions or of what may be claimed, but rather as descriptions of features specific to particular embodiments of particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A computing-processor-implemented method comprising:
   receiving a ciphertext output of an arithmetic evaluation function, the arithmetic evaluation function being performed on a ciphertext input homomorphically encrypted from a plaintext input using a set-system including sets having an intersection property; and
   decrypting the ciphertext output using a summation of two or more noise-canceling party identifiers of two or more authorized parties, wherein the intersection property of the sets cancels out errors generated during the decrypting operation for the two or more authorized parties and an attempting to decrypt the ciphertext output using a summation of one or more noise-canceling party identifiers of one or more unauthorized parties, wherein the intersection property of the sets fails to cancel out errors generated during the attempted decryption and the attempted decryption operation fails for the one or more unauthorized parties.

2. The computing-processor-implemented method of claim 1, wherein two vectors of a covering vector family of the set-system represent two sets of the set-system and have an inner product equal to a multiple of a non-prime integer when the size of the intersection of the sets represented by the two vectors is a multiple of the non-prime integer.

3. The computing-processor-implemented method of claim 1, wherein the ciphertext output is generated to be decrypted using the set-system including the sets having the intersection property.

4. The computing-processor-implemented method of claim 1, wherein each of the two or more noise-canceling party identifiers represents a summation of inner products of trust vectors corresponding to each of the two or more authorized parties.

5. The computing-processor-implemented method of claim 1, wherein the decrypting operation generates a plaintext result of the arithmetic evaluation function performed on the ciphertext input.

6. The computing-processor-implemented method of claim 1, wherein a set represented by a first summation of trust vectors of the two or more authorized parties is always a superset or subset of a set in the set-system and second summation of trust vectors of one or more unauthorized parties is never a superset or a subset of a set in the set-system.

7. A system comprising:
   one or more hardware processors;
   a communication interface coupled to the one or more hardware processors and configured to receive a ciphertext output of an arithmetic evaluation function, the arithmetic evaluation function being performed on a ciphertext input homomorphically encrypted from a plaintext input using a set-system including sets having an intersection property; and a decryptor executable by the one or more hardware processors and configured to decrypt the ciphertext output using a summation of two or more noise-canceling party identifiers of two or more authorized parties, wherein the intersection property of the sets cancels out errors generated during the decryption for the two or more authorized parties and an attempt to decrypt the ciphertext output using a summation of one or more noise-canceling party identifiers of one or more unauthorized parties, wherein the intersection property of the sets fails to cancel out the errors generated during the attempted decryption and the attempted decryption fails for the one or more unauthorized parties.

8. The system of claim 7, wherein two vectors of a covering vector family of the set-system represent two sets of the set-system and have an inner product equal to a multiple of a non-prime integer when the size of the intersection of the sets represented by the two vectors is a multiple of the non-prime integer.

9. The system of claim 7, wherein the ciphertext output is generated to be decrypted using the set-system including the sets having the intersection property.

10. The system of claim 7, wherein each of the two or more noise-canceling party identifiers represents a summation of inner products of trust vectors corresponding to each of the two or more authorized parties.

11. The system of claim 7, wherein the decryptor is further configured to generate a plaintext result of the arithmetic evaluation function performed on the ciphertext input.

12. The system of claim 7, wherein a set represented by a first summation of trust vectors of the two or more authorized parties is always a superset or subset of a set in the set-system and second summation of trust vectors of one or more unauthorized parties is never a superset or a subset of a set in the set-system.

13. One or more tangible processor-readable storage media embodied with instructions for executing on one or more processors and circuits of a computing device a process comprising:

receiving a ciphertext output of an arithmetic evaluation function, the arithmetic evaluation function being performed on a ciphertext input homomorphically encrypted from a plaintext input using a set-system including sets having an intersection property; and decrypting the ciphertext output using a summation of two or more noise-canceling party identifiers of two or more authorized parties, wherein the intersection property of the sets cancels out errors generated during the decrypting operation for the two or more authorized parties and an attempt to decrypt the ciphertext output using a summation of one or more noise-canceling Party identifiers of one or more unauthorized parties, wherein the intersection Property of the sets fails to cancel out errors generated during the attempted decryption and the attempted decryption operation fails for the one or more unauthorized parties.

14. The one or more tangible processor-readable storage media of claim 13, wherein two vectors of a covering vector family of the set-system represent two sets of the set-system and have an inner product equal to a multiple of a non-prime integer when the size of the intersection of the sets represented by the two vectors is a multiple of the non-prime integer.

15. The one or more tangible processor-readable storage media of claim 13, wherein the ciphertext output is generated to be decrypted using the set-system including the sets having the intersection property.

16. The one or more tangible processor-readable storage media of claim 13, wherein each of the two or more noise-canceling party identifiers represents a summation of inner products of trust vectors corresponding to each of the two or more authorized parties.

17. The one or more tangible processor-readable storage media of claim 13, wherein a set represented by a first summation of trust vectors of the two or more authorized parties is always a superset or subset of a set in the set-system and second summation of trust vectors of one or more unauthorized parties is never a superset or a subset of a set in the set-system.

* * * * *